Sept. 26, 1967     A. R. CLOSE ETAL     3,343,228
SEAT BELT BUCKLE
Filed March 30, 1966     2 Sheets-Sheet 1
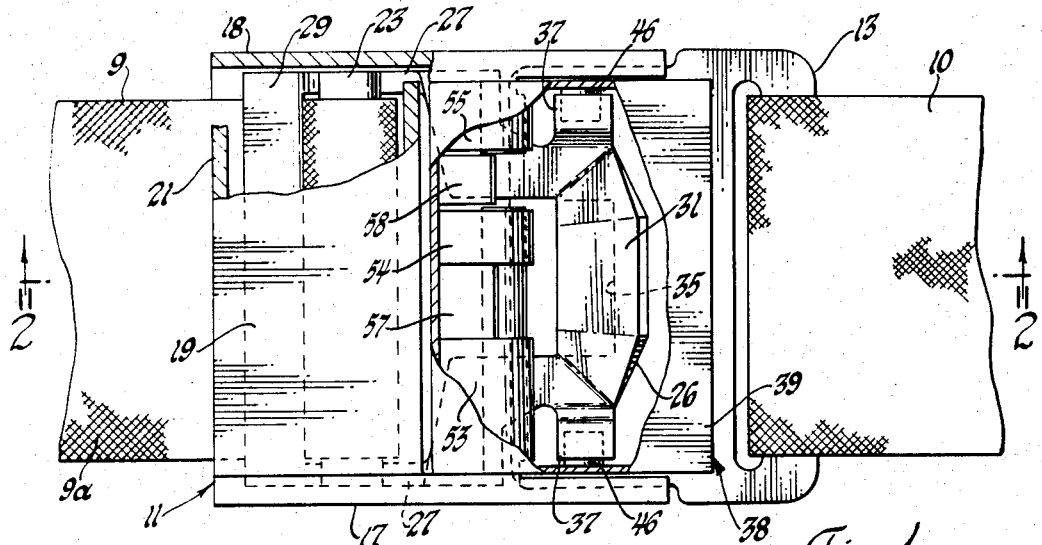
Fig. 1
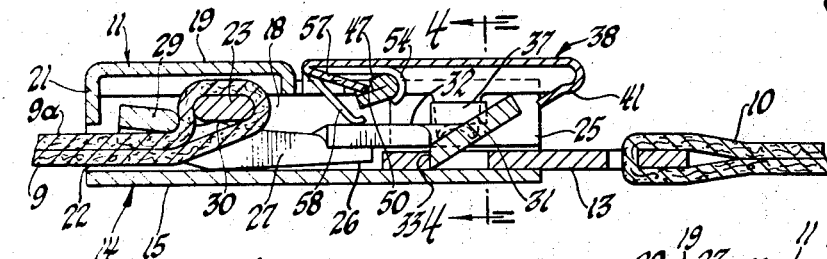
Fig. 2
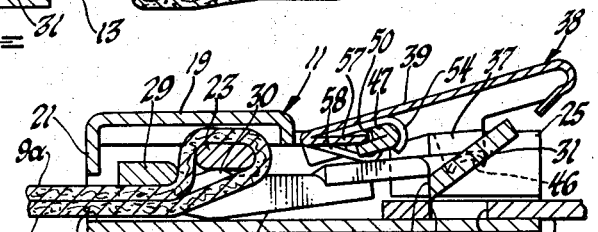
Fig. 3
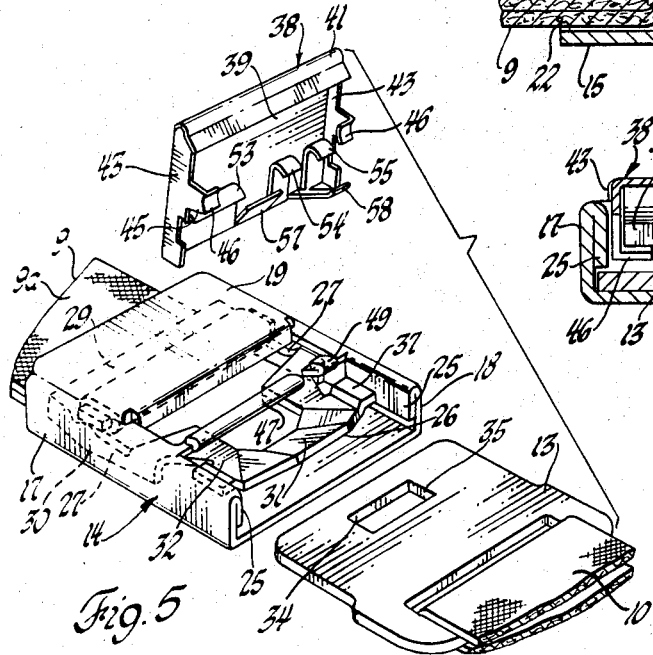
Fig. 4
Fig. 5
INVENTORS
Albert R. Close, &
Edwin H. Klove, Jr.
Paul Fitzpatrick
ATTORNEY

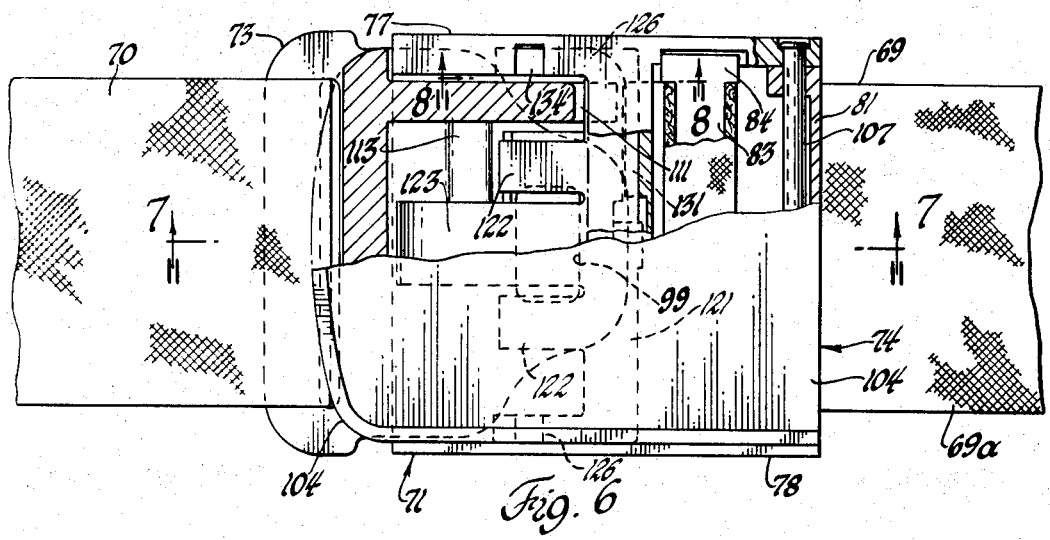

3,343,228
SEAT BELT BUCKLE

Albert R. Close, Oak Park, and Edwin H. Klove, Jr., Warren, Mich., assignors to General Motors Corporation, Detroit, Mich., a corporation of Delaware
Filed Mar. 30, 1966, Ser. No. 538,737
15 Claims. (Cl. 24—77)

Our invention is directed to improvements in the buckles or attaching arrangements of devices such as automobile seat belts. Because of the relation of these devices to safety, it is essential that they be strong and reliable. It is also important to the user that seat belt arrangements have an attractive appearance. Moreover, particularly when four seat belts are installed in an automobile, the cost is significant. Our invention is directed to a seat buckle structure which promotes economical construction and attractive appearance while providing a high degree of safety and reliability.

According to our invention, the two sections of a seat belt are coupled together in tension by a single latch member directly engaging one section and coupled to the other section through the usual lock plate or D-ring. The latch member is enclosed in a frame or casing which may provide the ornamental exterior and which also includes means for releasing the latch. Since the load is not carried through the frame, it need not be made of material selected for high strength but may be selected for its adaptability to a pleasant appearance and general appeal to the user. On the other hand, the load carrying latch, which is concealed, may be made of high strength materials which are not well adapted to ornamentation. Thus, the basic feature of the invention is that the load resulting from any tension on the seat belt is isolated from the external casing or frame of the buckle.

Other features contributing to the economy, reliability, and attractiveness of the buckle will be apparent upon consideration of the succeeding detailed description of preferred embodiments of the invention and the accompanying drawings thereof.

FIGURE 1 is a plan view, with parts cut away, of a seat belt coupling.

FIGURE 2 is a sectional view of the same taken on the plane indicated by the line 2—2 in FIGURE 1.

FIGURE 3 is a view corresponding to FIGURE 2 illustrating the releasing of the latch.

FIGURE 4 is a cross section taken on the plane indicated by the line 4—4 in FIGURE 2.

FIGURE 5 is a partially exploded axonometric view of the coupling.

FIGURE 6 is a plan view, with parts cut away, of a second embodiment.

FIGURE 7 is a sectional view taken on the plane indicated by the line 7—7 in FIGURE 6.

FIGURE 8 is a detail sectional view taken on the plane indicated by the line 8—8 in FIGURE 6.

FIGURE 9 is an exploded axonometric view of the embodiment of FIGURE 6.

Referring to the drawings, the restraining belt or belt assembly of the FIGURES 1 to 5 includes a first section of belt or webbing 9, a second section of belt or webbing 10, and means to couple the two sections together. The coupling means comprises a buckle assembly 11 and a lock plate or D-ring 13. The belt section 10 is looped through the D-ring and sewed or otherwise fixed together. The buckle assembly receives and locks to the locking plate 13.

The buckle assembly 11 includes a formed sheet metal frame 14 generally of box section including a base plate 15, side walls 17 and 18, a top plate 19 extending about half the length of the buckle, and a partial end wall 21.

The section 9 of the belt is threaded through the opening 22 between the end wall 21 and base plate 15 and looped around a crossbar 23 extending between the side walls 17 and 18. Crossbar 23 is a fixed part of the frame. The end 9a of the belt, after being looped around crossbar 23, extends out the opening 22 so that the length of the belt is adjustable by pulling on either portion of belt 9 so long as the belt is not under tension.

Tabs 25 extending from the right-hand end of walls 17 and 18 are bent downwardly, as shown clearly in FIGURES 4 and 5, the lower margins of these tabs defining with the base plate 15 a guideway for the locking plate 13.

Section 9 of the belt and the lock plate 13 are connected by a latch 26 which is a formed heavy sheet metal frame of somewhat involved configuration. The latch includes two side rails 27 joined by a bar 29 which, as shown most clearly in FIGURES 1 and 2, is in position to bear against the free end 9a of the belt, impinging it against the crossbar 23. The side rails 27 lie on each side of belt section 9 and each side rail includes a rounded projection 30 which bears against the underside of crossbar 23. The portion of the latch at the opposite end from bar 29 constitutes a bridge 32 joining the side rails 27. The central part of this bridge is a pawl 31, the under surface of which forms a ramp engageable by the locking plate upon insertion and the inner face 33 of which engages a face 34 of an opening 35 in the locking plate to retain the locking plate within the frame 14 as shown in FIGURES 1, 2, and 3. Between the latch portion 31 and the side rails 27, the latch frame 26 is approximately flat. It includes laterally projecting tabs 37 which cooperate with means to raise the latch plate, as viewed in FIGURES 2 and 3, to release the pawl 31 from the lock plate.

It should be noted that the latch 26 is freely mounted in the frame so that it can rock about an axis generally parallel to crossbar 23 and can slide to some extent, its sliding motion being limited by the belt portion 9 and the end wall 21. Since the latch directly connects the two sections of the belt and is loosely mounted in the frame, none of the belt tension is imposed upon the frame. The frame merely provides a suitable enclosure for the parts and has a function with respect to maintaining them in engagement and in releasing the latch.

The releasing operation is accomplished by a release lever or release plate 38 which preferably is a formed sheet of metal of substantially lighter gauge than the frame. The flat upper surface 39 of the release plate completes the enclosure of the top of the buckle assembly and lies substantially coplanar with the top wall 19 between the side walls 17 and 18. The plate has a recurved front edge 41 to grasp to raise the latch plate to the position shown in FIGURE 3. It has side flanges 43 from each of which a tab 45 depends, terminating in a curved lug 46. Lugs 46 lie under the tabs 37 of the latch 26. The release plate is hinged on a support provided by tabs 47 and 49 extending respectively from the side walls 17 and 18 of the frame. As shown clearly in FIGURE 2, these tabs are folded to define a curved right or forward surface and a notch 50 at the upper left. The plate 38 is pivotally mounted on this support by tabs bent from the left end of the plate, a tab 53 adjacent side 17 and two tabs 54 and 55 adjacent the other side. Tabs 53 and 54 engage the forward surface of support 47 and tab 55 similarly engages support 49. The plate is retained on the supports by a projection 57 extending from the rear edge of the plate between tabs 53 and 54 and disposed in the notch 50.

A still further projection 58 extending from the edge of release plate 38 between projections 54 and 55 constitutes a spring which biases the rear edge of plate 38 upwardly and engages bridge 30 to bias the latch 26 downwardly as viewed in FIGURE 2. The spring thus acts to keep the latch engaged when there is no tension on the belt and also serves to hold the release plate in its normal position. As will be apparent from comparison of FIGURES 2 and 3, when the release plate is pulled upwardly and tabs 46 raise the latch, spring finger 58 is bent more nearly into the plane of the top plate 39, thus resisting release of the latch and biasing the latch towards its operative position. It also exerts a sufficient moment about the pivot 47, 49 to restore the release plate to its normal position illustrated in FIGURE 2. The tab 57 also constitutes a spring which biases the rear edge of plate 38 upwardly in the same manner as tab 58, except that the end of tab 57 bears against the support 47 instead of the latch 26. It will be seen that the release plate 37 is an ingenious structure. The plate can be mounted by disposing the portions 53, 54, and 55 against the frame and pressing downwardly on the plate to deform tab 57 slightly upward so that the hinge joint is completed.

It should be further noted that the latch 26 serves not only as a latch to engage the D-ring 13 but also as a frictional lock for the section 9 of the belt. As long as bar 29 is not pulled firmly against the belt, as in FIGURE 3, either portion 9 or 9a of the belt section can be pulled to vary the length of the belt. When the belt is tightened, by engaging the latch and pulling on the end 9a of the belt, a strong frictional engagement and snubbing action is maintained by the bar 29 and crossbar 23 to hold the belt frictionally against paying out.

The second embodiment of the invention, illustrated in FIGURES 6 to 9, incorporates the basic principle described in the second paragraph of this specification in significantly different structure from the embodiment first described. From the standpoint of fabrication, the second embodiment is adapted for die casting rather than forming from sheet metal, and there are other features of interest. The spring means cooperating with the latch and the release is of quite different type from that of the first embodiment. The biasing coaction between the belt and the latch also involves different structure.

Referring to the drawings, the installation comprises a first section 69 of belt, a second section 70, a buckle assembly 71, and a lock plate or D-ring 73. The belt section 70 is attached to the D-ring which is inserted into and locked in the buckle assembly 71.

The buckle assembly 71 includes a frame 74, preferably die cast or pressure molded, including a base plate 75, side walls 77 and 78, and a partial end wall 81. Section 69 of the belt extends through an opening 82 in the end wall, around a crossbar 83 and back out through the opening 82, the end of the belt being designated 69a. Crossbar 83 is a somewhat rectangular pin with rectangular heads 84 which may move vertically in slots 85 in the side walls 77 and 78. Thus, the crossbar is restrained against any significant movement with the belt but may move toward or away from base plate 75. Ridges 87, 88, and 89 on the frame provide a guide for the lock plate 73, maintaining it in a plane spaced from the body of the base plate.

Section 69 of the belt and the lock plate are connected by a latch 90 which is a frame formed from heavy sheet metal. The latch includes two L-section side rails 93 which are joined at one end by a bar 94 and at the other end by a bridge 95. Bar 94 overlies the end portion 69a of the belt and the ends 84 of the crossbar ride on the upper surface of side rails 93. The belt portion 69 may be adjusted, and is held by the crossbar 83 and bar 94 when tension is put on the belt, as in the other embodiment. The latch also includes a forward projecting portion 97 which is lanced to provide a pawl 98. This pawl 98 is adapted to engage the portion 99 of the lock plate 73. Note that the moment of any force exerted by the belt portion 69 tends to rotate the latch 90 counterclockwise as viewed in FIGURE 7 to hold the latch in engagement. In this connection, the end of the side rails is beveled as indicated at 101 to provide a fulcrum at 102 about which the latch rotates in engagement with the base plate. The latch may slide along the base plate to a limited extent.

The buckle also includes a release lever or plate 104 which serves as the cover or top closure of the buckle. Plate 104 is of generally rectangular form with ears 105 for a hinge pin 107 fitted through openings 109 in the side walls of the frame. The release includes a projecting portion 110 which serves as a finger grip for lifting the release, two projections 111 which extend under the bridge 95 of the latch near the sides of the buckle to lift the latch, and a web 113 extending from the portion 110 of the release plate.

The remaining part of the buckle is a compound spring 120 formed from sheet metal which performs a number of functions. Spring 120 includes a base 121 extending across the buckle, latch biasing spring fingers 122 extending forwardly from the base, a release plate biasing spring finger 123 disposed between springs 122, and a lock plate biasing spring finger 125 extending downwardly in position to engage the leading edge of the lock plate when it is inserted. The spring 120 also includes two side arms 126 which provide a mounting for the piece. The frame 78 includes inwardly directed top flanges 127 which are interrupted by slots 129 and has also a top cross strut 130. The strut 130 defines a slot 131 above a ledge 132 within which the rear edge 133 of the spring 120 is received with the cross portion 121 bearing against the under surface of strut 130. Each side arm 126 is formed to provide a catch 134 which lodges in the slot 129 in the side flange 127, as shown most clearly in FIGURE 8. Thus, when the spring is in position, the catches 134 hold it within slot 131 and the reaction of the spring fingers 122 and 123 retain the spring against the strut 130 and flanges 127 with the catches 134 in position. Spring finger 125 extends through a break in the ledge 132 and rearwardly of the bridge 95 of the latch. When the lock plate is received in the buckle as in FIGURE 7, this spring bears against the lock plate, keeping it firmly in engagement with the latch and preventing any rattle. When the release plate 104 is lifted and latch 98 is raised by the lugs 111, the spring 125 partially ejects the lock plate so that it will not relatch as the release plate 110 is released or if the frame of the buckle tends to rise upon the release of tension. The force exerted on the lock plate by spring finger 125 also acts to provide a slight pressure between bar 94 and crossbar 83 to lightly hold the adjustment of belt portion 69 when the belt is buckled but has not been pulled tight.

The detailed description of preferred embodiments of the invention for the purpose of explaining the principles thereof is not to be considered as limiting or restricting the invention, as many modifications may be made by the exercise of skill in the art.

We claim:
1. A restraining belt comprising, in combination,
a buckle frame including a base plate
a first belt section
a latch loosely mounted in the frame directly connected to the first belt section independently of the frame
the latch rockably and slidably engaging a fulcrum on the frame
a pawl on the latch facing the base plate
the bar, fulcrum, and pawl being so disposed that tension on the first belt section biases the pawl toward the base plate
a second belt section including a lock plate insertable between the base plate and latch and engageable by the pawl to retain the second belt section coupled to the first belt section so that tension in the belt is transmitted solely through the latch from the first to the second section the frame including means to guide the lock plate upon insertion into the frame, and a release device mounted on the frame operable to release the pawl from the lock plate.

2. A belt as defined in claim 1 having spring means biasing the pawl into engagement with the lock plate and biasing the release device toward non-releasing position.

3. A belt as defined in claim 2 in which the spring means is an integral part.

4. A belt as defined in claim 3 in which the spring means is integral with the release device.

5. A belt as defined in claim 4 in which the release device is a formed sheet metal plate having integral recurved tabs disposed to hook over one side of a fulcrum and an integral tab disposed to engage the opposite side of the fulcrum, and the frame includes the said fulcrum.

6. A belt as defined in claim 1 having integral leaf spring means mounted on the frame including a leaf biasing the pawl into engagement with the lock plate and a leaf biasing the release device toward non-releasing position.

7. A belt as defined in claim 6 in which the spring means includes a further leaf disposed to bias the lock plate in the direction out of the frame.

8. A belt as defined in claim 6 in which the spring means includes spring arms bearing catches engaging the frame to retain the spring means in place on the frame.

9. A belt as recited in claim 1 including a crossbar generally parallel to and spaced from the base plate in which the first belt section is looped about the crossbar and in which the latch includes a bar parallel to the crossbar and normally impinging the first belt section between the bar and the crossbar to grip the belt when the belt is in tension.

10. A belt as defined in claim 9 having integral leaf spring means mounted on the frame including a leaf biasing the pawl into engagement with the lock plate and a leaf biasing the release device toward non-releasing position.

11. A belt as defined in claim 10 in which the spring means includes a further leaf disposed to bias the latch in the direction to impinge the bar against the belt at the crossbar.

12. A belt as defined in claim 9 in which the crossbar is mounted with freedom for movement toward and away from the base plate.

13. A belt as defined in claim 9 in which the fulcrum is on the base plate and the crossbar is between the fulcrum and the pawl.

14. A belt as defined in claim 9 in which the crossbar is fixed to the frame.

15. A belt as defined in claim 9 in which the crossbar is the fulcrum.

References Cited
UNITED STATES PATENTS 3,203,060    8/1965    Van Noord    24—77
3,248,769    5/1966    Oliver.

BERNARD A. GELAK, *Primary Examiner.*